(12) United States Patent
Canonge

(10) Patent No.: US 9,801,341 B2
(45) Date of Patent: Oct. 31, 2017

(54) EXTERNALLY ADJUSTABLE BAGGING ATTACHMENT

(75) Inventor: Eric Canonge, Charlotte, NC (US)

(73) Assignee: HUSQVARNA AB, Huskvarna (SE)

( * ) Notice: Subject to any disclaimer, the term of this patent is extended or adjusted under 35 U.S.C. 154(b) by 864 days.

(21) Appl. No.: 14/114,575

(22) PCT Filed: May 13, 2011

(86) PCT No.: PCT/US2011/036482
§ 371 (c)(1),
(2), (4) Date: Oct. 29, 2013

(87) PCT Pub. No.: WO2012/158148
PCT Pub. Date: Nov. 22, 2012

(65) Prior Publication Data
US 2014/0059998 A1    Mar. 6, 2014

(51) Int. Cl.
*A01D 43/00* (2006.01)
*A01D 43/077* (2006.01)
*A01D 43/063* (2006.01)

(52) U.S. Cl.
CPC ......... *A01D 43/077* (2013.01); *A01D 43/063* (2013.01); *A01D 43/0631* (2013.01); *A01D 43/0635* (2013.01); *A01D 43/0636* (2013.01)

(58) Field of Classification Search
CPC .. A01D 43/063; A01D 43/06; A01D 43/0636; A01D 43/077; A01D 43/0631; A01D 43/0638; A01D 43/0635
USPC .................. 56/202, 203–206, 16.6, 194–201
See application file for complete search history.

(56) References Cited

U.S. PATENT DOCUMENTS

| | | | | |
|---|---|---|---|---|
| 1,684,744 A * | 9/1928 | Reynolds | ............. | A01D 43/063 56/200 |
| 1,881,618 A * | 10/1932 | Jacobsen | ............... | A01D 43/063 56/200 |
| 2,862,346 A * | 12/1958 | Anderson | ............ | A01D 43/063 56/194 |
| 2,914,829 A | 12/1959 | Willemain | | |
| 2,970,421 A | 2/1961 | Krewson | | |
| 3,099,123 A * | 7/1963 | Price | .................... | A01D 43/063 56/194 |

(Continued)

FOREIGN PATENT DOCUMENTS

JP    EP 2468086 A1 *  6/2012  .......... A01D 43/063

OTHER PUBLICATIONS

International Search Report and Written Opinion of PCT/US11/36482 mailed Oct. 5, 2011, all enclosed pages cited.

(Continued)

*Primary Examiner* — Thomas B Will
*Assistant Examiner* — Joan D Misa
(74) *Attorney, Agent, or Firm* — McNair Law Firm, P.A.

(57) ABSTRACT

A riding lawn care vehicle may include a rear discharge and a bagging attachment. The rear discharge may be disposed at a rear of the riding lawn care vehicle. The bagging attachment may be configured to attach to the rear of the riding lawn care vehicle to receive debris discharged via the rear discharge. The bagging attachment may include an adjustable member that is accessible by an operator external to the bagging attachment to enable adjustment of a pivot point of the bagging attachment relative to the rear of the riding lawn care vehicle.

20 Claims, 10 Drawing Sheets

(56) References Cited

U.S. PATENT DOCUMENTS

| | | | |
|---|---|---|---|
| 3,257,788 A | | 6/1966 | Pirie |
| 3,503,192 A | | 3/1970 | Berg et al. |
| 4,214,424 A | | 7/1980 | Gobin |
| 5,018,346 A | | 5/1991 | Ishimaru et al. |
| 5,219,202 A | | 6/1993 | Rink et al. |
| 6,038,843 A | * | 3/2000 | Sebben ................ A01D 43/063 56/202 |
| 6,341,478 B1 | * | 1/2002 | Sallstrom ............ A01D 43/063 56/199 |
| 6,595,737 B1 | * | 7/2003 | Parish ................ A01D 43/0635 414/519 |
| 6,698,173 B2 | * | 3/2004 | Joseph ................ A01D 34/001 56/11.3 |
| 7,219,489 B2 | * | 5/2007 | Tada .................. A01D 43/0635 56/202 |
| 7,637,089 B2 | * | 12/2009 | Yamashita ........... A01D 43/063 56/202 |
| 7,992,373 B2 | * | 8/2011 | Ogata ................ A01D 43/0635 56/202 |
| 9,107,343 B1 | * | 8/2015 | Gaeddert ............... A01D 43/06 |
| 2003/0010006 A1 | | 1/2003 | Swart et al. |
| 2005/0120697 A1 | | 6/2005 | Percy et al. |
| 2006/0226143 A1 | | 10/2006 | Elstone, Sr. et al. |
| 2007/0056259 A1 | | 3/2007 | Uemura et al. |

OTHER PUBLICATIONS

Chapter I International Preliminary Report on Patentability of PCT/US11/36482 issued Nov. 19, 2013, all enclosed pages cited.

* cited by examiner

EXTERNALLY ADJUSTABLE BAGGING ATTACHMENT

TECHNICAL FIELD

Example embodiments generally relate to vehicle attachments and, more particularly, relate to attachments for vehicles configured for performing lawn maintenance.

BACKGROUND

Lawn care tasks are commonly performed using various tools and/or machines that are configured for the performance of corresponding specific tasks. Certain tasks, like grass cutting, are typically performed by lawn mowers. Lawn mowers themselves may have many different configurations to support the needs and budgets of consumers. Walk-behind lawn mowers are typically compact, have comparatively small engines (e.g., less than 200 cubic centimeters (cc)) and are relatively inexpensive. Meanwhile, at the other end of the spectrum, riding lawn mowers, such as lawn tractors, can be quite large and sometimes have engines exceeding 400 cc. Riding lawn mowers can sometimes also be configured with various functional accessories (e.g., trailers, tillers and/or the like) in addition to grass cutting components. Riding lawn mowers provide the convenience of a riding vehicle as well as a typically larger cutting deck as compared to a walk-behind model.

Some riding lawn mowers and lawn tractors may include attachments, such as bagging attachments that are configured to receive debris such as grass clippings or other yard waste in a detachable container. For a rear discharge riding lawn mower or lawn tractor, a specifically designed bagging attachment is typically designed for each model of riding lawn mower or lawn tractor in order to provide a good seal with the bagging attachment. If the bagging attachment does not mate well with the riding lawn mower or lawn tractor, the contents of the bagging attachment may escape.

In many situations, achieving a good fit when mating lawn care vehicles with their corresponding bagging attachments is difficult to achieve. In this regard, for example, due to the stack up of parts between the mating fender of the lawn care vehicle and the bagger cover of the bagging attachment, a poor fit often ends up being the likely result and dust and debris may then escape from the bagging attachment. Operators can attempt to adjust the fit. However, fit adjustment typically requires removal of the bagging attachment to adjust components inside the bagging attachment. After the adjustment, the operator then must reinstall the bagging attachment and check the fit. This can lead to an iterative process of bagging attachment removal, adjustment and replacement that may become tedious.

BRIEF SUMMARY OF SOME EXAMPLES

Accordingly, in order to provide a mechanism by which to enable operators to make bagging attachment fit adjustments without requiring bagging attachment removal, some example embodiments provide an externally adjustable bagging attachment. In some cases, the bagging attachment may include an externally adjustable carriage assembly that enables the operator to adjust the pivot point for engagement of the bagging attachment with the support structure of the lawn care vehicle. By making the pivot point adjustable via manipulation that is external to the bagging attachment, the operator may be enabled to adjust the fit between the bagging attachment and the lawn care vehicle (e.g., in a fore and aft direction) without repeatedly removing the bagging attachment.

In one example embodiment, a riding lawn care vehicle is provided. The riding vehicle may include a rear discharge and a bagging attachment. The rear discharge may be disposed at a rear of the riding lawn care vehicle. The bagging attachment may be configured to attach to the rear of the riding lawn care vehicle to receive debris discharged via the rear discharge. The bagging attachment may include an adjustable member that is accessible by an operator external to the bagging attachment to enable adjustment of a pivot point of the bagging attachment relative to the rear of the riding lawn care vehicle.

In another example embodiment, an externally adjustable baggage attachment attachable to a riding lawn care vehicle is provided. The externally adjustable baggage attachment may include an adjustable member that is accessible by an operator external to the bagging attachment to enable adjustment of a pivot point of the bagging attachment relative to a rear of a riding lawn care vehicle to which the bagging attachment is configured to be attachable. The riding lawn care vehicle may include a rear discharge disposed at the rear of the riding lawn care vehicle.

Some example embodiments may improve an operator's ability to effectively limit the escape of dust and debris from a bagging attachment with reduced effort and complication. The user experience associated with using attachments on a riding lawn care vehicle, and particularly the bagging attachment of the riding lawn care vehicle may therefore be improved.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 1, which includes FIGS. 1A, 1B, 1C and 1D, illustrates views of a riding lawn care vehicle having a bagging attachment removed (FIGS. 1A and 1C) and installed (FIGS. 1B and 1D) according to respective different conditions of an example embodiment;

Figure 2:
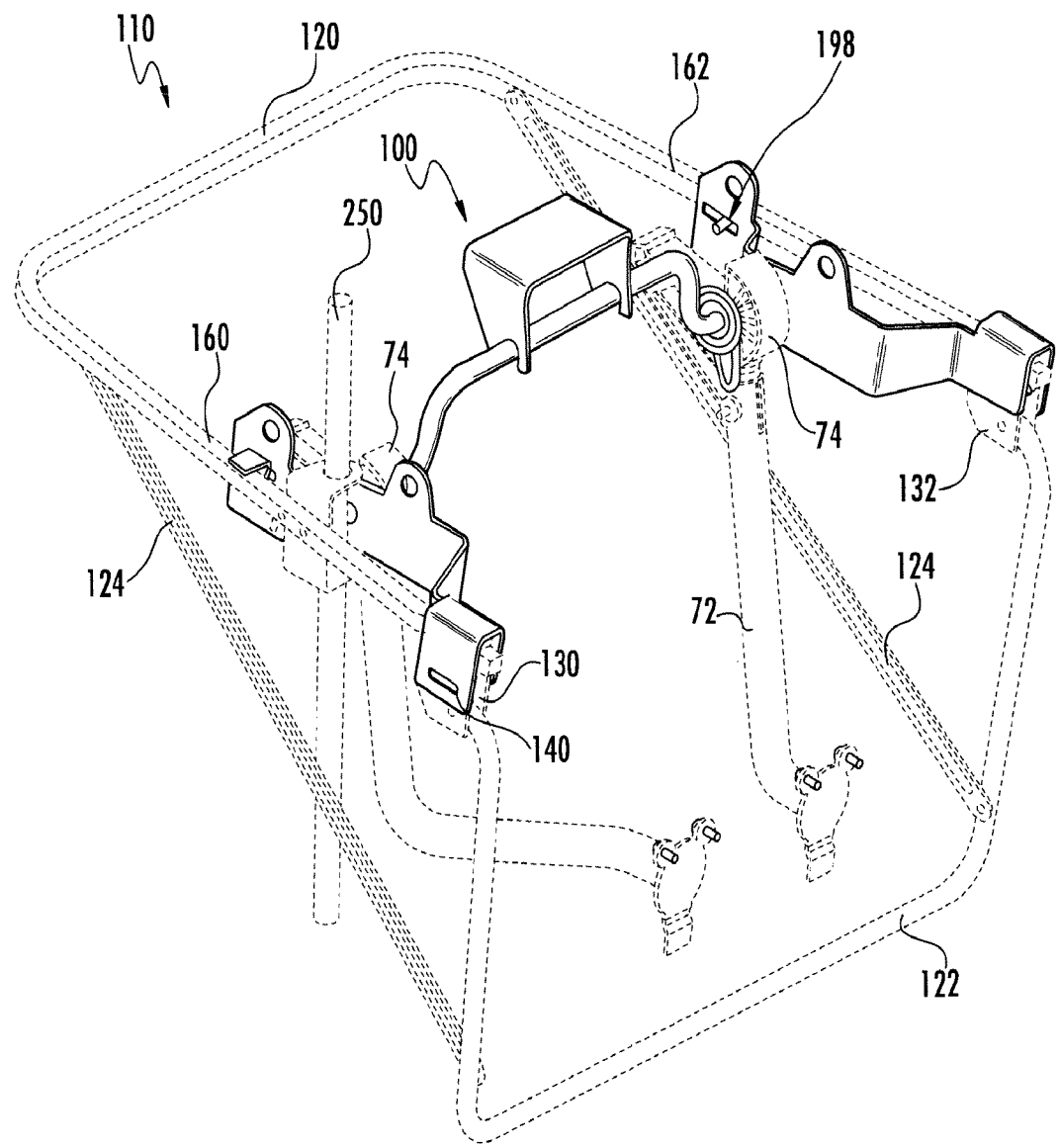
FIG. 2 illustrates a perspective view of a carriage assembly attached to a bagging attachment support structure of the riding lawn care vehicle of FIG. 1 according to an example embodiment.
Figure 4A:
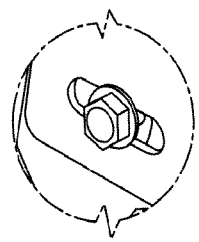
Figure 4B:
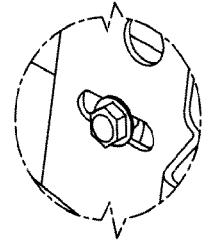
Figure 5:
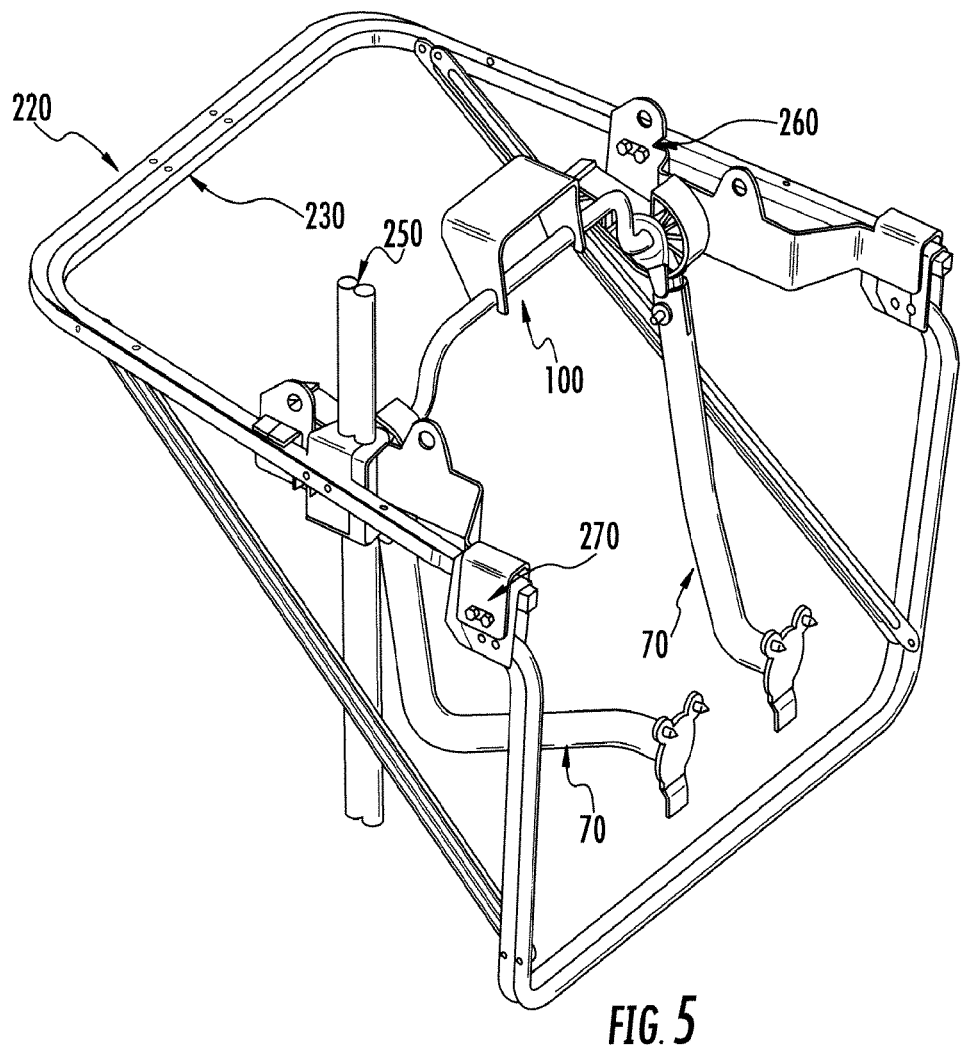
Figure 6:
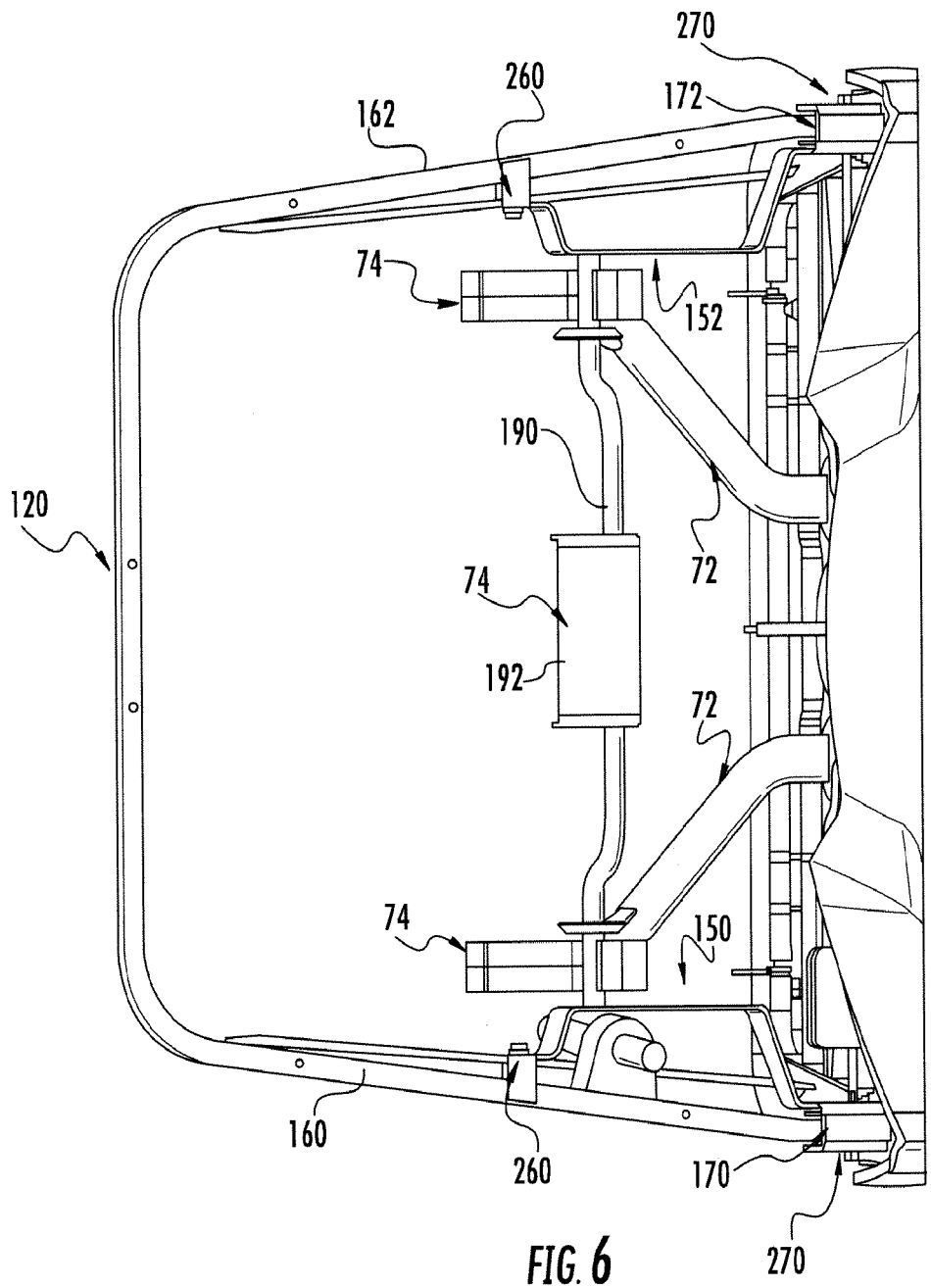
Figure 7:
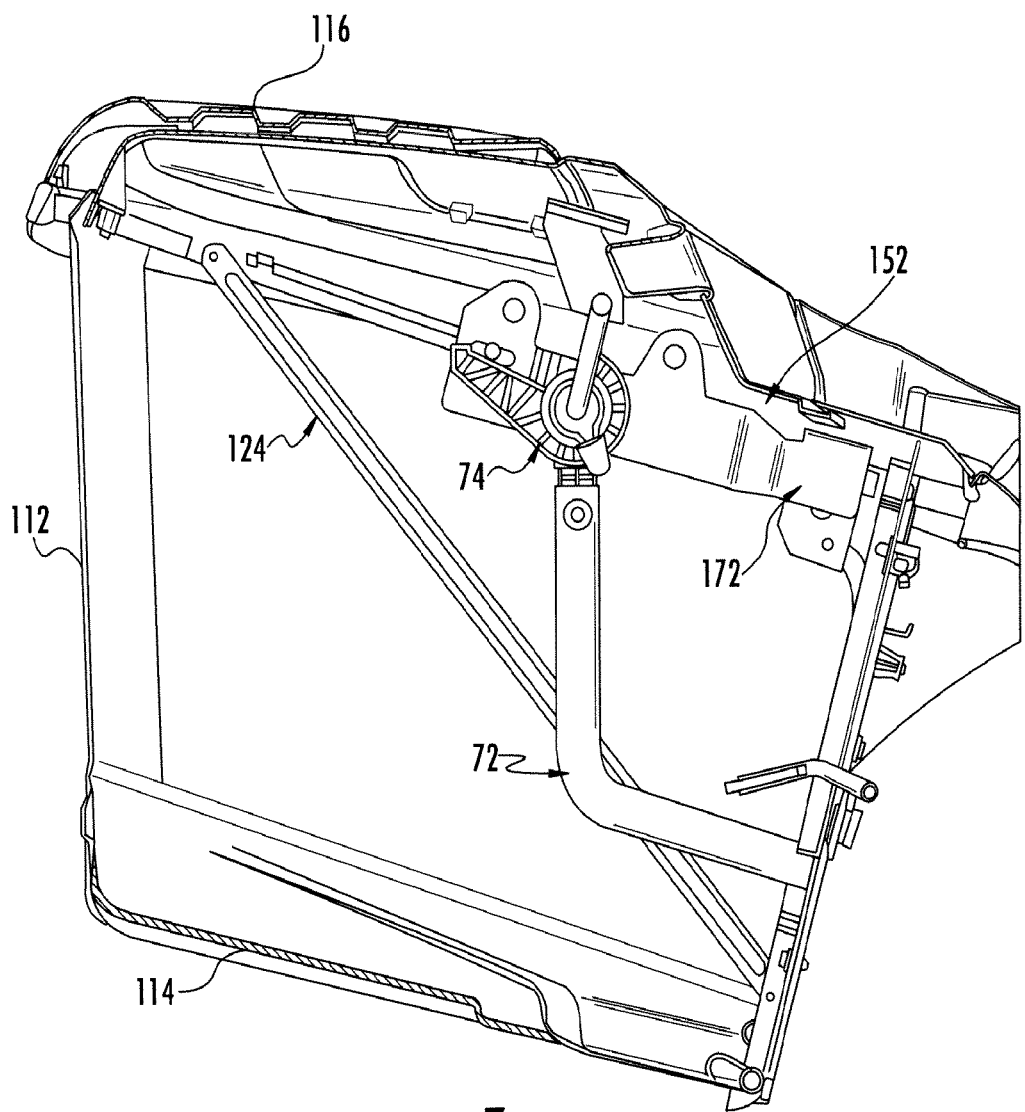
Figure 8:
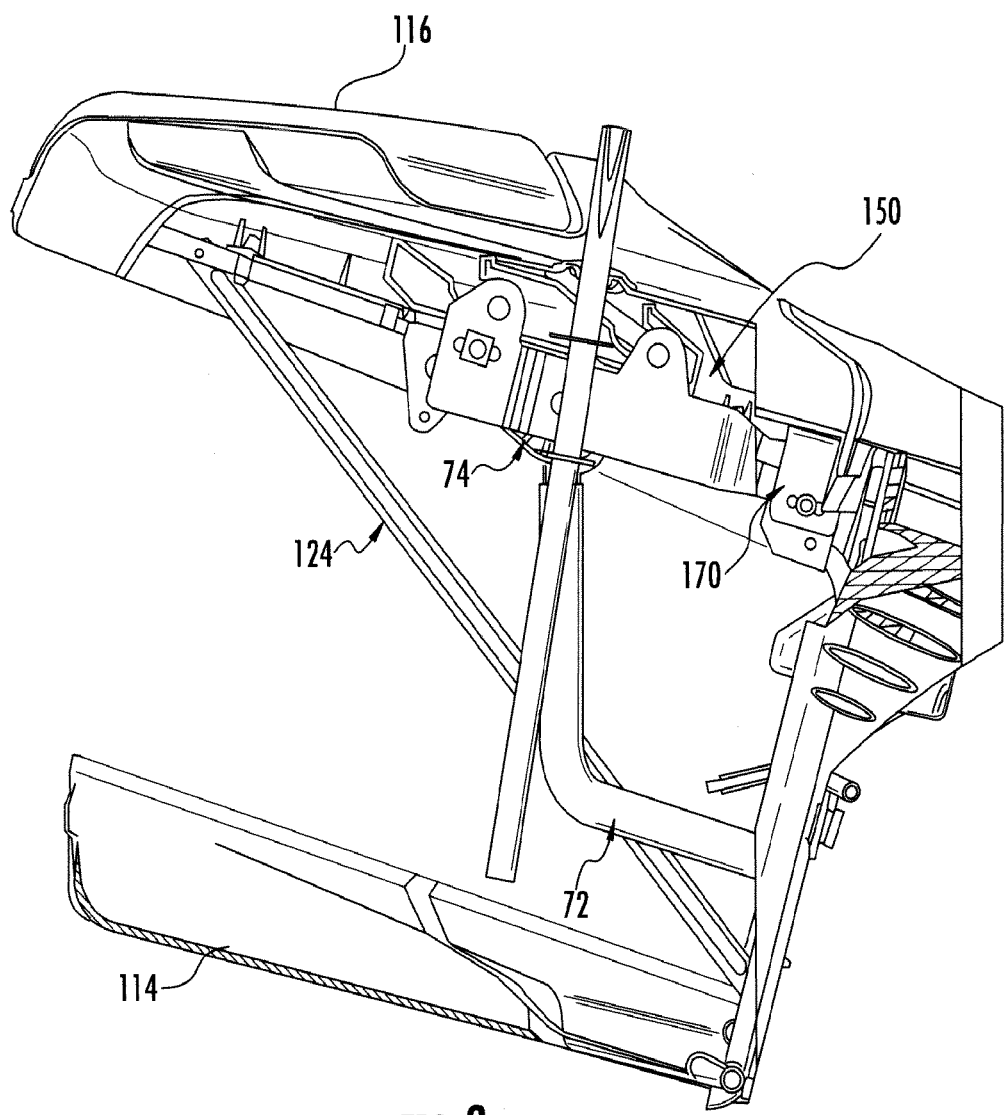

FIG. 4, which includes FIGS. 4A and 4B, illustrates more detailed perspective views of a first sleeve bracket (FIG. 4A) and a second guide slot (FIG. 4B) of the example of FIG. 2 according to an example embodiment;

FIG. 5 illustrates a full aft view and a full forward view of different positions of the carriage assembly and bag frame superimposed into the same image to illustrate the full range of motion of the carriage assembly according to an example embodiment;

FIG. 6 illustrates a top view of the bagging attachment with the bag top partially removed to expose a view of the carriage assembly according to an example embodiment;

FIG. 7 illustrates a cross section view of the bagging attachment through a middle portion of the bagging attachment showing a view of the left half of the bagging attachment according to an example embodiment; and FIG. 8 illustrates a cross section view of the bagging attachment through the middle of the bagging attachment showing a view of the right half of the bagging attachment according to an example embodiment.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true.

Some example embodiments may provide an externally adjustable bagging attachment. By providing an externally adjustable bagging attachment, repeated attachment and removal of the bagging attachment to improve mating by trial and error may be prevented. In this regard, for example, operators may be enabled to adjust a position of a pivot point for engagement of the bagging attachment with the support structure of the lawn care vehicle to improve bagging attachment fit via an external adjustment only. By making the pivot point adjustable via manipulation that is external to the bagging attachment, the operator may be enabled to adjust the fit between the bagging attachment and the lawn care vehicle without repeatedly removing the bagging attachment. Accordingly, the escape of dust and debris from a bagging attachment may be reduced with less effort and complication.

Figure 1A:
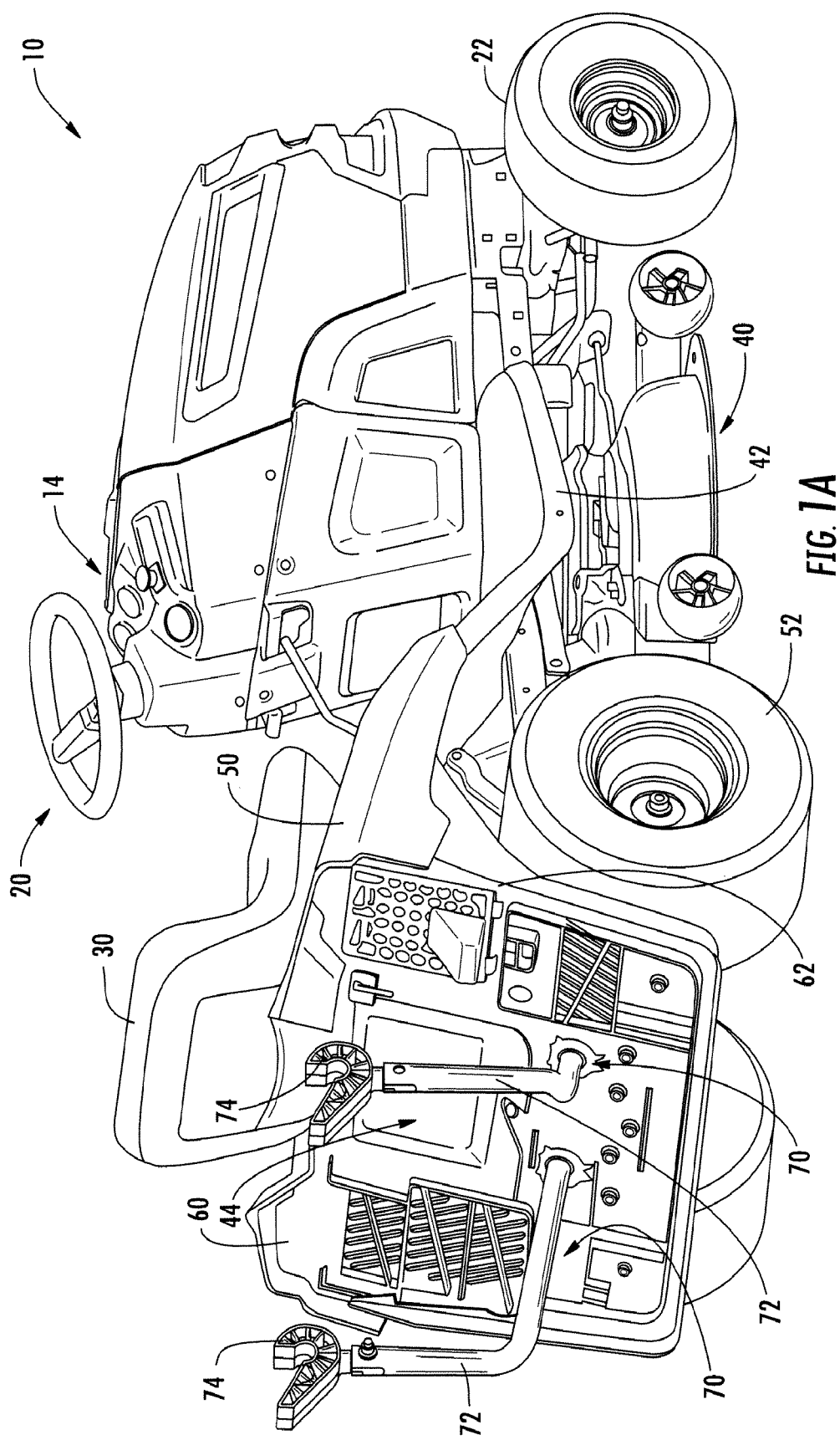
Figure 1B:
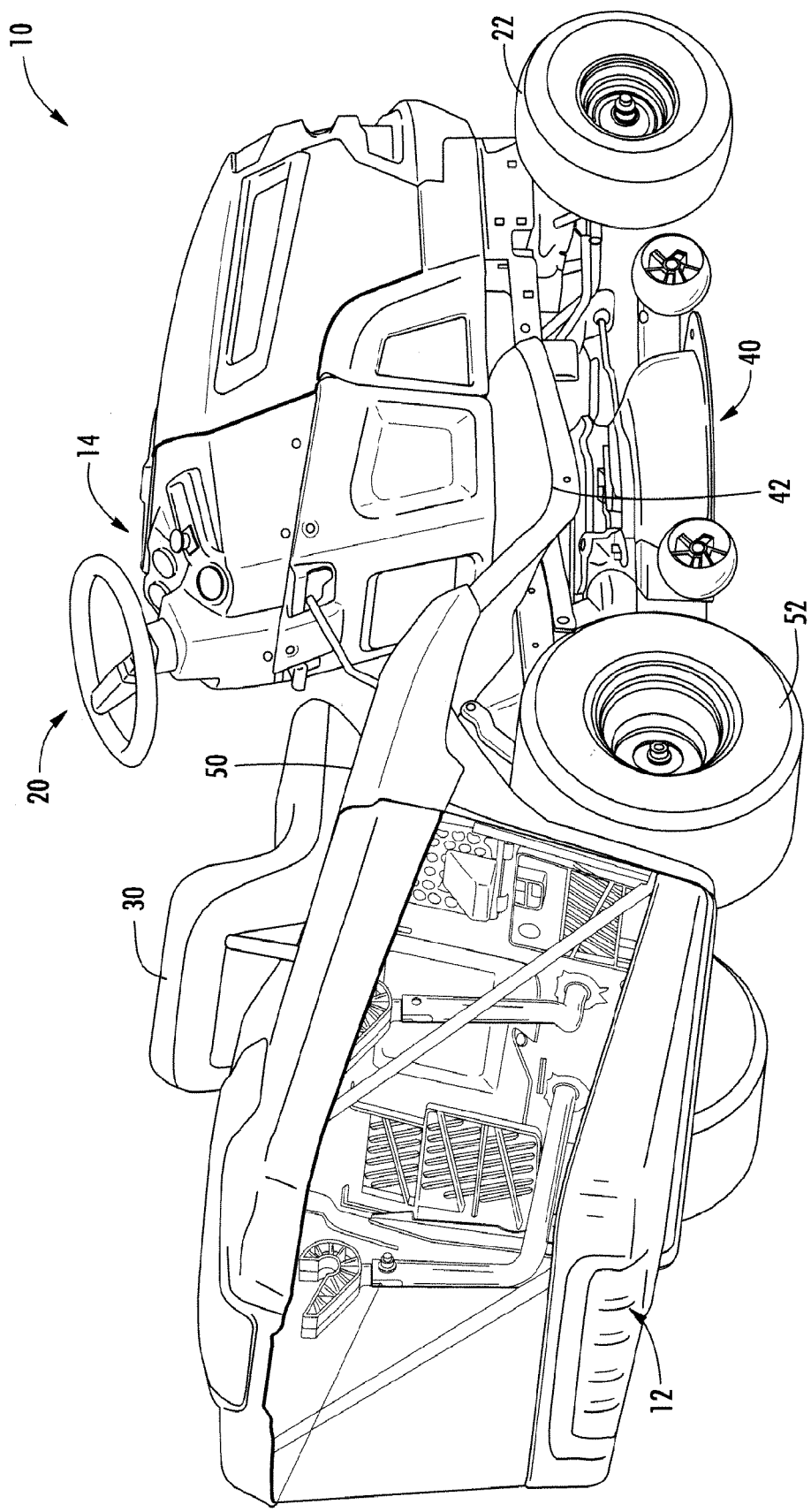
Figure 1C:
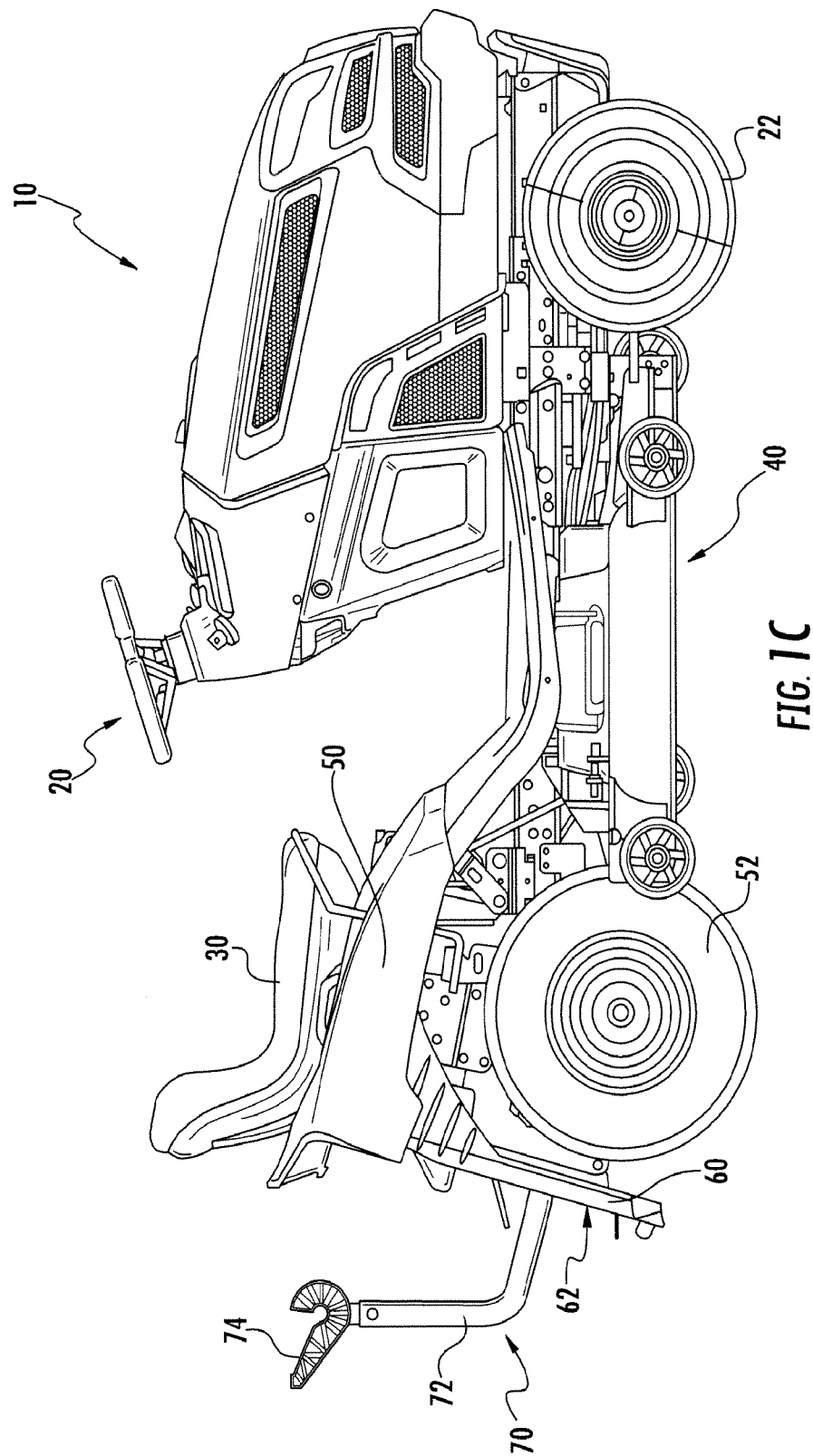
Figure 1D:
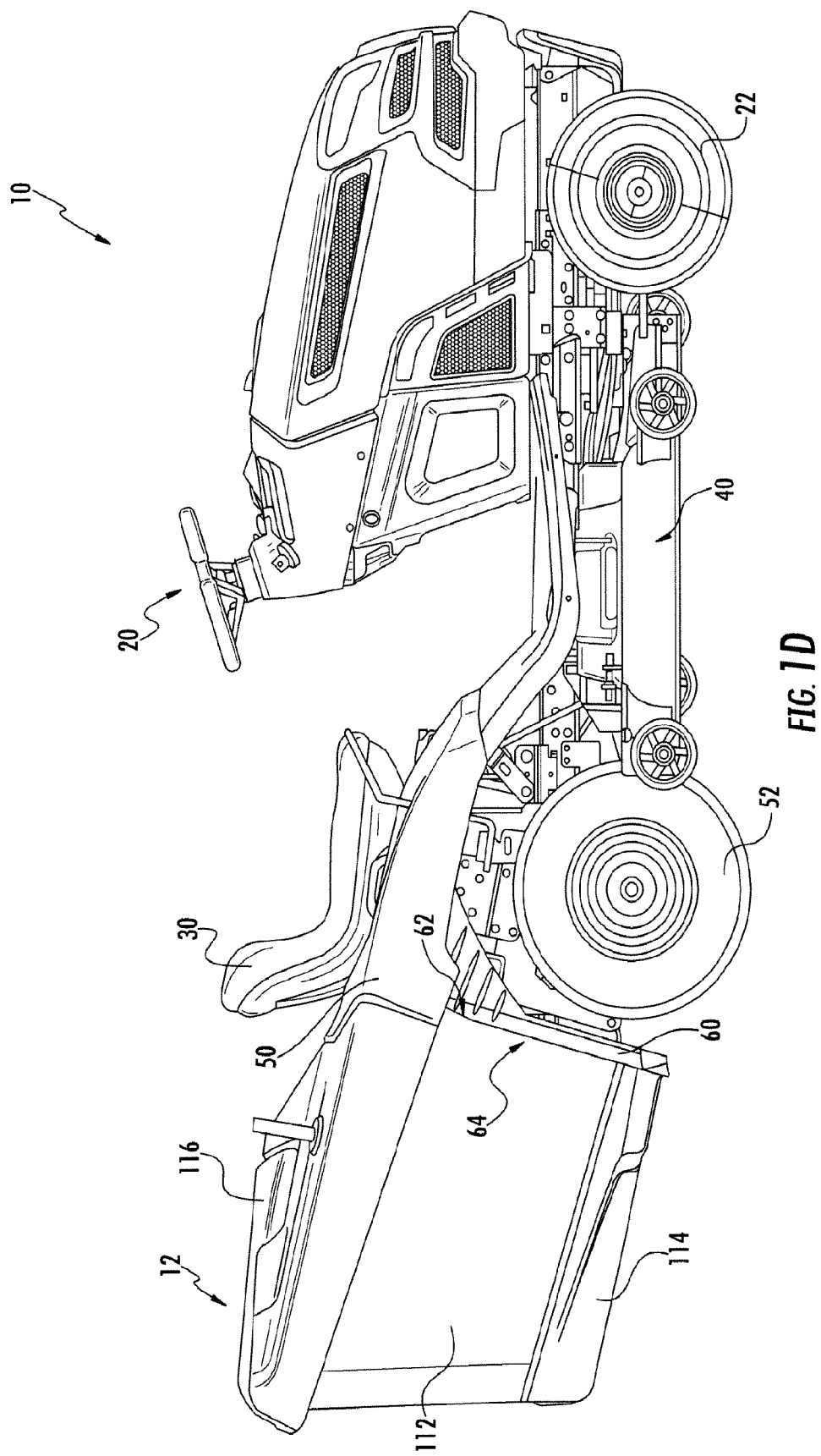

FIGS. 1A and 1B illustrate a perspective view of a riding lawn care vehicle 10 having a bagging attachment 12 removed (FIG. 1A) and installed (FIG. 1B) according to respective different conditions of an example embodiment. FIG. 1C illustrates a side view of the riding lawn care vehicle 10 with the bagging attachment 12 removed and FIG. 1D illustrates a side view of the riding lawn care vehicle 10 with the bagging attachment 12 installed to show fore and aft directions as they will be referred to herein. As shown and described herein, the riding lawn care vehicle 10 may be a riding lawn mower (e.g., a lawn tractor, front-mount riding lawn mower, zero-turn riding lawn mower, and/or the like) having a rear discharge. Thus, some example embodiments may apply to lawn care vehicles with rear discharge bagging attachments. In other embodiments of the invention, the adjustable bagging attachment may be used on other lawn care vehicles (e.g., walk-behind lawn mowers, robotic mowers, and/or the like) and other vehicles.

In some embodiments, the riding lawn care vehicle 10 may include an information panel 14 that may include gauges and/or controls related to operation of the riding lawn care vehicle 10. In an example embodiment, the riding lawn care vehicle 10 may include a steering assembly 20 (e.g., a steering wheel, handle bars, or the like) functionally connected to front (or rear) wheels 22 of the riding lawn care vehicle 10 to allow the operator to steer the riding lawn care vehicle 10. The operator may sit on a seat 30 positioned rearward of the steering assembly 20, as shown in FIG. 1. However, in other example embodiments, the seat 30 may be positioned in a middle or front portion of the riding lawn care vehicle 10. The riding lawn care vehicle 10 may also include a cutting deck 40 having at least one cutting blade mounted therein. The cutting deck 40 may be positioned behind the front wheels 22 (or forward of the front wheels 22 in some examples) in a position to enable the operator to cut grass using the cutting blade when the cutting blade is rotated below the cutting deck 40 when the cutting deck 40 is in a cutting position. In some embodiments, a footrest 42 (e.g., one on each side of the riding lawn care vehicle 10) may also be positioned above the cutting deck 40 to enable the operator to rest his or her feet thereon while seated in the seat 30. When operating to cut grass, the grass clippings may be expelled from the cutting deck 40 via a rear discharge 44. The rear discharge 44 may be positioned below the seat 30 and may expel the grass clippings out of a discharge path positioned in the center portion of the back of the riding lawn care vehicle 10 into the bagging attachment 12, when the bagging attachment 12 is attached to the riding lawn care vehicle 10. In some example embodiments, the rear discharge 44 may not necessarily be provided in the center portion of the back of the riding lawn care vehicle 10, but may be positioned off to one side (e.g., over the tire).

In the pictured example embodiment, the engine of the riding lawn care vehicle 10 is positioned in front of the operator. However, in other example embodiments, the engine could be in different positions such as below or behind the operator. As shown in FIG. 1, the riding lawn care vehicle 10 may include rear fenders 50 positioned proximate to rear wheels 52. The rear fenders 50 may form a portion of the body of the riding vehicle and the rear fenders 50 may include a rear surface that is shaped to connect to or otherwise mate with top portions of a back plate 60. The back plate 60 may include a seating surface 62 that extends substantially around an external perimeter of the back plate 60 and is shaped to fit in relatively close proximity or otherwise mate with the bagging attachment 12 to form a relatively tight fit or seal between the bagging attachment 12 and the back plate 60. The bagging attachment 12 may include a mating surface 64 that is configured to fit in relatively close proximity or otherwise mate with the seating surface 62 of the back plate 60.

When the mating surface 64 and the seating surface 62 are fit together in relatively close proximity, a good fit or seal may be provided between the back plate 60 and the bagging attachment 12 to prevent the escape of dust and/or debris from the bagging attachment 12. In some embodiments, there may not be any actual connective features on either the mating surface 64 or the seating surface 62 to actively engage corresponding receptive features on the opposing surface. In other words, although there may be protrusions and/or corresponding recesses on opposing faces to improve sealing characteristics of the components, there may be no clamps, brackets, flanges, bolts, couplings, latches, and/or the like disposed on either the mating surface 64 or the seating surface 62 to secure the surfaces to each other. Instead, the mating surface 64 and the seating surface 62 may simply fit together in close proximity to each other when the bagging attachment 12 is affixed to the riding lawn care vehicle 10 appropriately, as described in greater detail below.

As shown in FIG. 1A, when the bagging attachment 12 is removed, the back plate 60 is exposed and forms a substantial portion of the back end of the riding lawn care vehicle 10. In this regard, the back plate 60 extends to substantially cover an entirety of the rear of the frame of the riding lawn care vehicle 10. In some examples, a bagging attachment support structure 70 extends through the back plate 60 out the rear of the riding lawn care vehicle 10. The bagging attachment support structure 70 of this example embodiment includes two support rods 72. The support rods 72 of this example are substantially L-shaped and connect to the frame of the riding lawn care vehicle 10 via openings in the back plate 60. The support rods 72 initially extend from the back of the riding lawn care vehicle 10 in a direction that is substantially parallel to a plane in which the bottom of the bagging attachment 12 lies when the bagging attachment 12 is attached to the riding lawn care vehicle 10. The support rods 72 may include a bend, forming the L-shape, that extends the support rods 72 away from the bottom of the bagging attachment 12. The bagging attachment support structure 70 may include carriage receptacles 74 disposed at distal ends of the support rods 72. The carriage receptacles 74 may be shaped to receive a portion of a carriage assembly 100 of the bagging attachment 12 and to support the weight of the bagging attachment 12 when the bagging attachment 12 is attached to the riding lawn care vehicle 10 and to provide a mechanism by which to attach the bagging attachment 12 to the bagging attachment support structure 70.

In an example embodiment, the bagging attachment 12 may be constructed such that it is assembled around the carriage assembly 100. In this regard, a bag frame 110 (see FIG. 2), bag sidewalls 112, a bag bottom 114, and bag top 116 of the bagging attachment 12 may all be supported (e.g., directly or indirectly) by the carriage assembly 100. In some cases, the carriage assembly 100 may be a weldment of components arranged to have an externally adjustable pivot point such that, by adjusting the pivot point, the fit between the mating surface 64 and the seating surface 62 may be adjusted without requiring removal of the bagging attachment 12. In this regard, the carriage assembly 100 may allow for fore and aft adjustment of the pivot point of the bagging attachment 12 while the carriage assembly 100 is being supported by the bagging attachment support structure 70.

FIG. 2 illustrates a perspective view of the carriage assembly 100 attached to the bagging attachment support structure 70 of the riding lawn care vehicle 10 of FIG. 1 according to an example embodiment. In this regard, the carriage assembly 100 is highlighted in bold in order to better illustrate how the carriage assembly 100 interacts with the bag frame 110 and the bagging attachment support structure 70, which are illustrated in dashed lines. As can be seen from FIG. 2, the carriage assembly 100 may be placed in the carriage receptacles 74 of the bagging attachment support structure 70 in order to connect the bagging attachment 12 to the riding lawn care vehicle 10. The point of engagement between the carriage assembly 100 and the bagging attachment support structure 70 is fixed in this example embodiment, due to the position of the bagging attachment support structure 70 being fixed relative to the riding lawn care vehicle 10. Thus, although some example embodiments may provide for external adjustment of the pivot point of the bagging attachment 12 by enabling external adjustment of the bagging attachment support structure 70 (e.g., by extension or contraction of a length, position or angle of the support rods 72), this example embodiment may achieve adjustment of the pivot point by enabling modification of the position of the carriage assembly 100 relative to the bag frame 110.

As shown in FIG. 2, the carriage assembly 100 may be slidingly connected to the bag frame 110 to enable the operator to shift the pivot point of the bagging attachment 12. As such, the point of fixed connection between the carriage assembly 100 and the bag frame 110 may be adjusted. The bag frame 110 may include a top frame member 120, a front frame member 122 and support members 124. In an example embodiment, the top frame member 120 and the front frame member 122 may each be substantially U shaped bars, tubes or other support structures made of metal or other rigid material. The support members 124 may be substantially linear bars, tubes, rods or other support structures that are also made of metal or another rigid material and may be disposed such that opposite longitudinal ends of the support members 124 are affixed to a portion of a respective one of the top frame member 120 and the front frame member 122. In an example embodiment, opposite longitudinal ends of the support members 124 may be bolted, welded or otherwise affixed proximate to corresponding bent portions (used to form the U shape) of respective sides of the top frame member 120 and the front frame member 122.

Although FIG. 2 illustrates the top frame member 120 and the front frame member 122 as each being respective single pieces bent or otherwise formed to include three distinct legs, it should be appreciated that either or both of the top frame member 120 and the front frame member 122 could alternatively be formed by affixing component members (e.g., three separate leg pieces) together. Moreover, in some example embodiments, one or more of the top frame member 120 and the front frame member 122 may have a more rounded or oval shape between the respective ends of each of the top frame member 120 and the front frame member 122.

In an example embodiment, the top frame member 120 may be positioned to lie in a plane that lies substantially perpendicular to a plane in which the front frame member 122 lies when end portions of the top frame member 120 and the front frame member 122 are joined together. A first bracket 130 may engage respective first ends of both the top frame member 120 and the front frame member 122 to connect the top frame member 120 and the front frame member 122. A second bracket 132 may engage respective second ends of both the top frame member 120 and the front frame member 122 to connect the top frame member 120 and the front frame member 122.

In the example embodiment shown in FIG. 2, the first and second brackets 130 and 132 may be held in a fixed connection with the respective first and second ends of the front frame member 122. In this regard, for example, the first and second brackets 130 and 132 may be welded, bolted, locked or pinned to the respective first and second ends of the front frame member 122. Meanwhile, the first and second brackets 130 and 132 may also be held in a fixed connection with the respective first and second ends of the top frame member 120. Thus, the first and second brackets 130 may form a rigid attachment means between the respective first ends of the top frame member 120 and front frame member 122 and between the respective second ends of the top frame member 120 and front frame member 122. Although only one is visible in FIG. 2, each of the first and second brackets 130 and 132 may include an adjustment member such as a bolt, rod, detent and/or the like (e.g., adjustment bolt 140) that provides a fixed attachment point to facilitate slidable engagement of the carriage assembly 100 to the first and second brackets 130 and 132 as described in greater detail below. Thus, the adjustment bolt 140 provides a fixed engagement point to facilitate the provision of slidable engagement between the carriage assembly 100 and the bag frame 110.

According to an example embodiment, the front frame member 122 may be disposed at a front or forward portion of the bagging attachment 12. Meanwhile, bent portions of the top frame member 120 may be disposed at a back or after portion of the bagging attachment 12. A bag may be defined by walls (e.g., three bag sidewalls 112, a bag bottom 114, and bag top 116, as shown in FIG. 1) that may be made of rigid materials, flexible materials, or combinations of rigid and flexible materials over various portions of the bag. In an example embodiment, the bag bottom 114 and bag top 116 may be made of rigid materials (e.g., plastic and/or a light metal) while the bag sidewalls 112 are made of a flexible material. The bag may be assembled or otherwise positioned around the bag frame 110 such that the bag top 116 rests at least in part on the top frame member 120. The bag bottom 114 may be supported by the bag top 116 via connection with the bag sidewalls 112. As such, the bag sidewalls 112 may extend downward (along the support members 124) from each edge portion of the bag top 116 other than at the forward portion of the bagging attachment 12 to connect to corresponding edges of the bag bottom 114 thereby defining an opening at the forward portion of the bagging attachment 12 to form or attach to the mating surface 64. By adjusting a position of the carriage assembly 100 in fore and aft directions, the pivot point of the bagging attachment 12 may be correspondingly adjusted.

Figure 3:
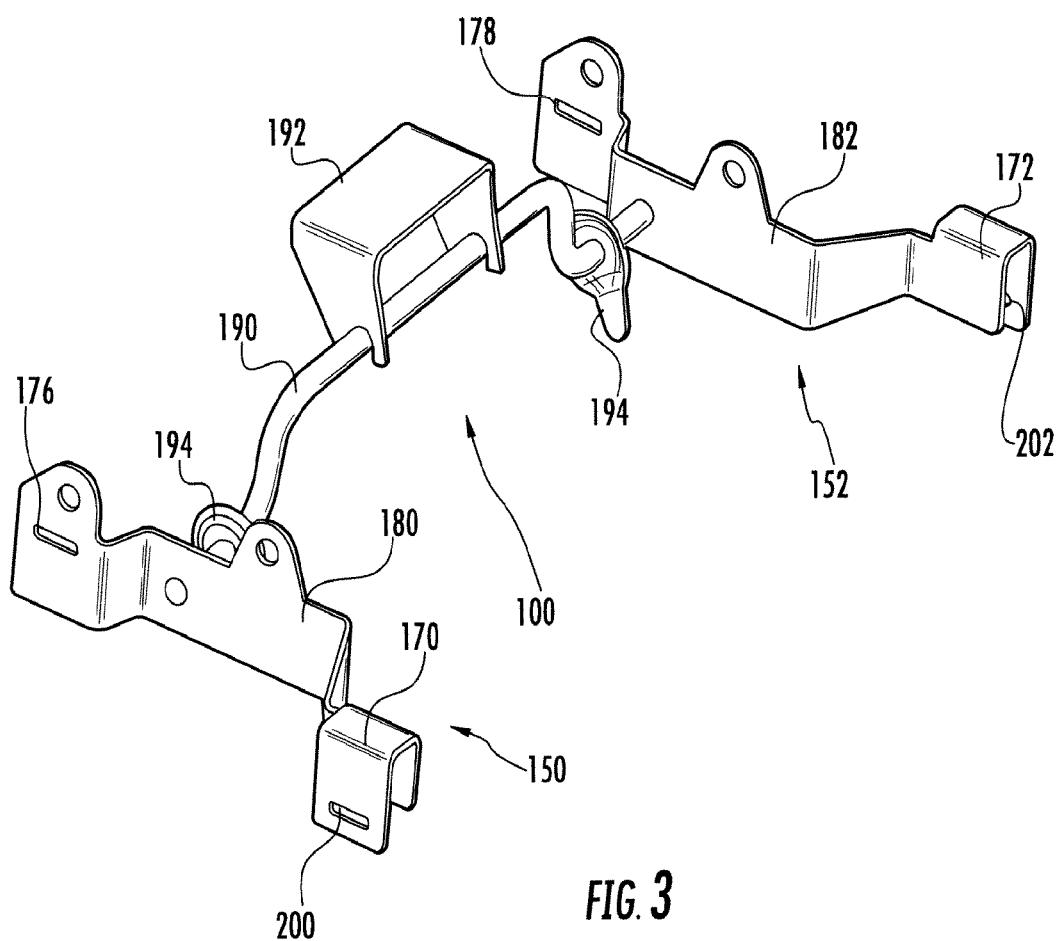
FIG. 3 illustrates a perspective view of the carriage assembly isolated from other components according to an example embodiment.

FIG. 3 illustrates a perspective view of the carriage assembly 100 isolated from other components. A further description of the carriage assembly 100 will now be provided in reference to FIGS. 2 and 3. The carriage assembly 100 includes a first externally adjustable bracket assembly 150 and a second externally adjustable bracket assembly 152. The first externally adjustable bracket assembly 150 may be slidably connected to a first leg 160 of the top frame member 120. The second externally adjustable bracket assembly 152 may be slidably connected to a second leg 162 of the top frame member 162. The first and second legs 160 and 162 may be spaced apart from each other but otherwise extend substantially parallel to each other having respective proximal ends that are proximate to the front of the bagging attachment 12 (and the front frame member 122) and distal ends that are proximate to the bent portions of each respective leg that form the U shape of the top frame member 120. In an example embodiment, the first leg 160 and the second leg 162 may extend parallel to each other over their entire lengths. However, in other example embodiments, the first and second legs 160 and 162 may diverge away from each other as they approach the first and second brackets 130 and 132, respectively. In some cases, only end portions of the first and second legs 160 and 162 may be parallel to each other at a portion proximate to the first and second brackets 130 and 132, respectively (for example, as shown in FIG. 6 below).

In an example embodiment, the first and second externally adjustable bracket assemblies 150 and 152 may each include a respective sleeve bracket (e.g., first sleeve bracket 170 and second sleeve bracket 172) and respective guide slot (e.g., first guide slot 176 and second guide slot 178). The first sleeve bracket 170 and the first guide slot 176 may be disposed at opposite longitudinal ends of a first connecting member 180 forming a portion of the carriage assembly 100. The second sleeve bracket 172 and the second guide slot 178 may be at opposite longitudinal ends of a second connecting member 182 forming a portion of the carriage assembly 100 that is positioned substantially to mirror the placement of the first connecting member 180. The first and second connecting members 180 and 182 may each be configured to extend along the first and second legs 160 and 162, respectively, and slidably engage the first and second legs 160 and 162 via the corresponding first and second sleeve brackets 170 and 172 and the first and second guide slots 176 and 178. A cross tube 190 may extend between the first and second connecting members 180 and 182 in a direction that is substantially perpendicular to the longitudinal length of the first and second connecting members 180 and 182. In some embodiments, the cross tube 190 may include a centrally positioned handle or handle mount 192 that may connect to portions of the bag top 116 or be accessible through the bag top 116 to facilitate engagement or disengagement of the cross tube 190 with the carriage receptacles 74 when installing or removing the bagging attachment 12. In some embodiments, the cross tube 190 may also include engagement guides 194 to facilitate side-to-side alignment of the cross tube 190 with the carriage receptacles 74.

As shown in FIG. 2, the first and second guide slots 176 and 178 may each be defined by an elongated orifice or slot that extends substantially parallel to the longitudinal length of the first and second legs 160 and 162 when the carriage assembly 100 is attached to the top frame member 120. A bolt, rod, detent, peg or other protruding member (e.g., bolt 198) attached to each of the first and second legs 160 and 162 may be passed through the first and second guide slots 176 and 178, respectively. In an example embodiment, the bolt (which may be, for example, a shoulder bolt or the like) or other protruding member may not be tightened or even be capable of tightening against the carriage assembly in some cases. As such, the bolt or other protruding member may simply be provided for adding stability with respect to slidably moving the carriage assembly 100 fore and aft along the first and second legs 160 and 162.

The first and second sleeve brackets 170 and 172 may each wrap around the top frame member 120 and the corresponding first and second brackets 130 and 132, respectively. An adjustment member of each of the first and second brackets 130 and 132 may be passed through a corresponding first engagement slot 200 of the first sleeve bracket 170 and second engagement slot 202 of the second sleeve bracket 172. The entire carriage assembly 100 (and therefore also the pivot point for engagement of the bagging attachment 12 to the carriage receptacles 74) may be slid fore and aft along the first and second guide slots 176 and 178 and the first and second engagement slots 200 and 202. As such, the weight of the carriage assembly 100 may substantially be borne by the corresponding protruding members passed through the first and second guide slots 176 and 178, respectively, and the corresponding adjustment members passed through the corresponding first and second engagement slots 200 and 202, respectively. Some example embodiments may limit a range of motion over which the fore and aft sliding may be accomplished based on the length of the first and second guide slots 176 and 178 and the first and second engagement slots 200 and 202. In this regard, the protruding member of each leg and the adjustment member of each bracket may be limited in their range of motion based on their ability to slide within the confines defined by the first and second guide slots 176 and 178 and the first and second engagement slots 200 and 202. In an example embodiment, the lengths of the first and second guide slots 176 and 178 and the first and second engagement slots 200 and 202 may be substantially the same.

While the protruding member that is associated with each of the first and second guide slots 176 and 178 may be a peg, bolt, rod, detent, or the like, that is not meant to be tightened in order to permit free movement of the protruding member within a corresponding one of the first guide slot 176 or the second guide slot 178, the adjustment members of an example embodiment may be alternately capable of being tightened or loosened. In the example of FIG. 2, an adjustment member may be enabled to slide within a respective one of the first and second engagement slots 200 and 202 when the adjustment member is not in a tightened state. However, the adjustment bolt may be capable of being adjusted to be in a tightened state based on operator action. When the adjustment member (e.g., adjustment bolt 140) is tightened, a corresponding one of the first and second sleeve brackets 170 and 172 may be substantially fixed in its position relative to the top frame member 120 with respect to its fore and aft orientation. Although FIG. 2 illustrates a hex head bolt as an example of an adjustable member, it should be appreciated that other adjustable fastening member or fixing means may alternatively be employed such as, for example, wing bolts, wing nuts, cam locks, spring loaded levers, spring pins, and/or the like.

Referring now to the first sleeve bracket 170 shown in FIG. 2, it should be appreciated that by shaping the first sleeve brackets 170 as a U shaped bracket, the first sleeve bracket 170 may be formed to enable disposal of the first sleeve bracket to extend over the first bracket 130 that holds the top frame member 120 and the front frame member 122 together. In an example embodiment, a majority of the first externally adjustable bracket assembly 150 may be disposed between the legs of the top frame member 120. However, since the first sleeve bracket 170 of this example is formed in a U shape, one portion of the U shaped bracket may extend outside of the area between the legs of the top frame member 120 and be accessible from outside of the bagging attachment 12. By tightening the adjustment bolt 140 (e.g., using fingers, or some other tool such as a wrench that may be provided with the riding lawn care vehicle 10 or may be provided by the operator), which may also be accomplished from outside of the bagging attachment 12, the carriage assembly 100 may be fixed in its fore and aft position relative to the top frame member 120. Thus, the operator may be enabled to slide the fore and aft position of the carriage assembly 100 to alter the pivot point of the bagging attachment 12 in order to adjust the fit between the mating surface 64 and the seating surface 62.

FIG. 4, which includes FIGS. 4A and 4B, illustrates more detailed perspective views of the first sleeve bracket 170 (FIG. 4A) and the second guide slot 178 (FIG. 4B) of FIG. 2 according to an example embodiment. The example of FIG. 4 illustrates the bolt 198 positioned at a mid point within the second guide slot 178 and the adjustment bolt 140 positioned at a mid point within the first engagement slot 200. To lock the pivot point of the bagging attachment 12 at a position corresponding to the situation displayed in FIG. 4, the adjustment bolt 140 may be tightened. However, it should be appreciated that the pivot point of the bagging attachment 12 may be shifted forward by loosening the adjustment bolt 140 and moving the carriage assembly 100 to the right (according to the orientation shown in the example of FIGS. 2 and 4). To shift the pivot point of the bagging attachment 12 aft, or toward the rear of the riding lawn care vehicle 10, the carriage assembly may be shifted forward by loosening the adjustment bolt 140 and sliding the carriage assembly 100 to the left (according to the orientation shown in the example of FIGS. 2 and 4).

FIG. 5 illustrates a full aft view 220 and a full forward view 230 superimposed into the same image, so that the full range of motion of the carriage assembly 100 may be appreciated according to an example embodiment. As shown in FIG. 5, the bagging attachment support structure 70 is fixed and also holds the carriage assembly 100 in a fixed location. However, since the carriage assembly 100 is enabled to slide along the legs of the top frame member 120 in fore and aft directions, an image of the bag frame 110 appears at a rear position in the full aft view 220 and an image of the bag frame appears to have moved forward in the full forward view 230.

FIG. 6 illustrates a top view of the bagging attachment 12 with the bag top 116 partially removed to expose a view of the carriage assembly 100. FIG. 6 illustrates both protruding members 260 disposed to engage the top frame member 120 from inside the bagging attachment 12 and both adjustment members 270 disposed to engage the top frame member 120 from a position that is reachable from outside of the bagging attachment 12. In the example embodiment shown, where the adjustment members comprise bolts, only the head of the bolt needs to be accessible from outside of the bagging attachment in order to allow a person outside the bagging attachment 12 to adjust the bagging attachment for and aft relative to the back plate of the riding lawn care vehicle without having to remove the bagging attachment 12 from engagement with the carriage receptacles 74. In an example embodiment, the operator may use grip rod 250 and/or the handle mount 192 (which is connected to or otherwise accessed via the bag top 116 and configured so that it can be used by the operator to lift the baggage attachment 12 from the carriage receptacles 74) to assist with shifting the bag frame 110 fore and aft relative to the carriage assembly 100 and the back plate 60 of the riding lawn care vehicle 10 when the adjustment members 270 are loosened.

In some embodiments of the invention, the baggage attachment 12 can be rotated by an operator relative to the riding lawn care vehicle 10 and the back plate 62 in order to dump the contents of the baggage attachment 12. For example, in one embodiment of the invention, the carriage assembly 100 pivotably couples to the carriage receptacles 74. An operator can then pull forward on the grip rod 250, which may slide upwards out of the baggage attachment 12 to provide the operator with greater leverage, in order to rotate the baggage attachment 12 relative to the rest of the vehicle and about the carriage receptacles 74 in such a way that the forward open portion of the baggage attachment 12 rotates from it's position against the back plate 60 downward so that it faces the ground and the contents are dumped onto the ground. As such, in some cases, the baggage attachment 12 may rotate about the pivot point to facilitate dumping the contents of the bagging attachment 12. However, more generally, the term pivot point should be understood to refer to a reference point about which the bagging attachment balances in the fore and aft direction for mating the bagging attachment to a rear portion of the lawn care vehicle. Thus, there is not necessarily rotational movement associated with adjustment of the pivot point in all cases. In some cases, the pivot point may be adjusted by sliding a position of the carriage assembly 100 relative to the bag frame 110 and thereby adjust the position of the bag frame 110 relative to a position of fixed bagging attachment support structures 70. However, in some other examples, the pivot point may be adjusted by adjusting a position of the bagging attachment support structures 70 themselves. In either case, for example embodiments, the adjustment is enabled to be conducted outside of the baggage attachment 12. It should also be appreciated that the pivot point could be vertically adjusted in addition to or instead of merely being adjustable horizontally.

FIG. 7 illustrates a cross section view of the bagging attachment through a middle portion of the bagging attachment showing a view of the left half of the bagging attachment according to an example embodiment. FIG. 8 illustrates a cross section view of the bagging attachment through the middle portion of the bagging attachment showing a right half of the bagging attachment according to an example embodiment. FIGS. 7 and 8 offer different views to further illustrate the position of various components according to one example embodiment. However, other arrangements are also possible.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A riding lawn care vehicle comprising:
   a rear discharge disposed at a rear of the riding lawn care vehicle; and
   a bagging attachment configured to attach to the rear of the riding lawn care vehicle to receive debris discharged via the rear discharge, the bagging attachment including an adjustable member that is accessible by an operator external to the bagging attachment to enable fixing a pivot point of the bagging attachment in one of a plurality of positions by adjusting a position of the adjustable member in a fore or aft direction relative to the rear of the riding lawn care vehicle to adjust a fit between the bagging attachment and the riding lawn care vehicle.

2. The riding lawn care vehicle of claim 1, wherein the bagging attachment comprises a carriage assembly to which a bag frame of the bagging attachment slidably connects, and wherein movement of the carriage assembly relative to the bag frame adjusts the pivot point of the bagging attachment.

3. The riding lawn care vehicle of claim 2, wherein the riding lawn care vehicle includes a bagging attachment support structure configured to support the carriage assembly in a fixed location relative to the riding lawn care vehicle, such that movement of the carriage assembly relative to the bag frame causes movement of the bag frame relative to the rear of the riding lawn care vehicle.

4. The riding lawn care vehicle of claim 2, wherein the bag frame comprises a top frame member including a first leg and a second leg that extend parallel to each other to engage respective end portions of a front frame member proximate to an open end of the bagging attachment that attaches to the rear of the riding lawn care vehicle.

5. The riding lawn care vehicle of claim 4, wherein the carriage assembly comprises a first sleeve bracket and a second sleeve bracket that extend over the first and second legs respectively to slidably connect the carriage assembly to the bag frame via the adjustable member.

6. The riding lawn care vehicle of claim 4, wherein the carriage assembly slidably engages each of the first leg and the second leg via a corresponding at least one protrusion extended through a corresponding slot to limit motion of the carriage assembly based on a size of the corresponding slot.

7. The riding lawn care vehicle of claim 4, wherein the carriage assembly slidably engages each of the first leg and the second leg via at least two protrusions extended through respective slots, and wherein a first one of the at least two protrusions associated with each respective leg extends into an interior portion of the bag frame and a second one of the at least two protrusions associated with each respective leg extends outward from the bag frame to be accessible external to the bagging attachment.

8. The riding lawn care vehicle of claim 7, wherein the second one of the at least two protrusions is configured to be tightened or loosened to a tightened state or loosened state, respectively.

9. The riding lawn care vehicle of claim 2, wherein the adjustable member is configured to be tightened or loosened to a tightened state or loosened state, respectively, and wherein the adjustable member comprises a protruding member disposed to extend into a slot associated with the carriage assembly to enable the carriage assembly to slide relative to the bag frame when the adjustable member is in the loosened state, and to fix a position of the carriage assembly relative to the bag frame when the adjustable member is in the tightened state.

10. The riding lawn care vehicle of claim 1, wherein the adjustable member comprises a hex head bolt, a wing bolt, a wing nut, a cam lock, a spring loaded lever, or a spring pin.

11. An externally adjustable bagging attachment for a riding lawn care vehicle, the bagging attachment comprising:
    an adjustable member that is accessible by an operator external to the bagging attachment to enable fixing a pivot point of the bagging attachment in one of a plurality of positions by adjusting a position of the adjustable member in a fore or aft direction relative to a rear of a riding lawn care vehicle to which the bagging attachment is configured to be attachable to adjust a fit between the bagging attachment and the riding lawn care vehicle, the riding lawn care vehicle including a rear discharge disposed at the rear of the riding lawn care vehicle.

12. The bagging attachment of claim 11, further comprising a carriage assembly to which a bag frame of the bagging attachment slidably connects, and wherein movement of the carriage assembly relative to the bag frame adjusts the pivot point of the bagging attachment.

13. The bagging attachment of claim 12, wherein the carriage assembly is supportable in a fixed location relative to the riding lawn care vehicle by a bagging attachment support structure, such that movement of the carriage assembly relative to the bag frame causes movement of the bag frame relative to the rear of the riding lawn care vehicle.

14. The bagging attachment of claim 12, wherein the bag frame comprises a top frame member including a first leg and a second leg that extend parallel to each other to engage respective end portions of a front frame member proximate to an open end of the bagging attachment that attaches to the rear of the riding lawn care vehicle.

15. The bagging attachment of claim 14, wherein the carriage assembly comprises a first sleeve bracket and a second sleeve bracket that extend over the first and second legs respectively to slidably connect the carriage assembly to the bag frame via the adjustable member.

16. The bagging attachment of claim 14, wherein the carriage assembly slidably engages each of the first leg and the second leg via a corresponding at least one protrusion extended through a corresponding slot to limit motion of the carriage assembly based on a size of the corresponding slot.

17. A lawn care vehicle comprising:
 a discharge configured for discharging debris received by the lawn care vehicle; and
 a bagging attachment configured to mate with a portion of the lawn care vehicle to receive debris from the discharge, the bagging attachment comprising:
  a bag portion configured to hold the debris received from the discharge; and
  an adjustable member that, when the bagging attachment is attached to the lawn care vehicle, is accessible by an operator external to the bagging attachment to enable fixing a pivot point of the bagging attachment in one of a plurality of positions by adjusting a position of the adjustable member in a fore or aft direction relative to the portion of the lawn care vehicle to adjust a fit between the bagging attachment and the lawn care vehicle;
 wherein the portion of the lawn care vehicle comprises a plate surrounding the discharge, and wherein the bagging attachment further comprises:
  a carriage assembly to which a bag frame of the bag portion slidably connects, wherein the adjustable member enables the operator to slide the bag frame relative to the carriage assembly in order to move the bag portion toward or away from the plate.

18. The lawn care vehicle of claim 17, further comprising:
 a bagging attachment support structure configured to support the carriage assembly in a fixed location relative to the plate, such that movement of the carriage assembly relative to the bag frame causes movement of the bag frame relative to the plate.

19. The lawn care vehicle of claim 17, wherein the adjustable member is configured to be tightened or loosened to a tightened state or loosened state, respectively, and wherein the adjustable member comprises a protruding member disposed to extend into a slot associated with the carriage assembly to enable the carriage assembly to slide relative to the bag frame when the adjustable member is in the loosened state, and to fix a position of the carriage assembly relative to the bag frame when the adjustable member is in the tightened state.

20. The lawn care vehicle of claim 17, wherein the discharge is disposed proximate an aft portion of the vehicle, wherein the plate is disposed proximate an aft portion of the vehicle, wherein the bagging attachment is disposed aft of the discharge and the plate, wherein the carriage assembly is configured to permit sliding of the bag portion fore and aft relative to the riding vehicle, and wherein the adjustable member is configured to enable securing of the bag portion relative to the plate.

* * * * *